United States Patent [19]

Baltzer et al.

[11] B 3,982,073
[45] Sept. 21, 1976

[54] SYSTEM FOR MEASURING THE DURATION OF A TELEPHONE CALL

[75] Inventors: Gary L. Baltzer; Duane A. Desler; George Pappas, all of Omaha, Nebr.

[73] Assignee: Western Electric Company, Inc., New York, N.Y.

[22] Filed: Jan. 29, 1975

[21] Appl. No.: 545,050

[44] Published under the second Trial Voluntary Protest Program on January 20, 1976 as document No. B 545,050.

[52] U.S. Cl. ................... 179/7.1 R; 179/7.1 TP
[51] Int. Cl.² ................................. H04M 15/18
[58] Field of Search ........... 179/7.1 R, 7.1 TP, 7 R, 179/6.31, 2 TC, 6.3 R

[56] References Cited
UNITED STATES PATENTS

| | | | |
|---|---|---|---|
| 2,910,537 | 10/1959 | Lomax | 179/6.31 |
| 3,097,266 | 7/1963 | Luscher | 179/7 R |
| 3,164,677 | 1/1965 | Morris et al. | 179/7.1 R |
| 3,573,378 | 4/1971 | Leyburn et al. | 179/7.1 R |
| 3,590,161 | 6/1971 | Jacobs | 179/7.1 R |
| 3,760,101 | 9/1973 | Burns | 179/6.3 |
| 3,769,463 | 10/1973 | Graham et al. | 179/7.1 TP |
| 3,801,745 | 4/1974 | Zuckerman | 179/7.1 R |

*Primary Examiner*—Kathleen H. Claffy
*Assistant Examiner*—Gerald L. Brigance
*Attorney, Agent, or Firm*—D. D. Bosben; R. P. Miller

[57] ABSTRACT

A system for use in a telephone exchange to measure the duration of a telephone call includes an electrical power source from which pulses of constant frequency are applied to first and second pulse generating circuits for generating pulses at selected frequencies representative of a call initial time rate and a call overtime rate, respectively. Each of the pulse generating circuits can be programmed independently to generate pulses at different selected frequencies representative of different call time rates. The pulses from the generating circuits are applied to a plurality of pulse counting circuits through respective pulse count control circuits. At the beginning of a telephone call, one of the pulse counting circuits is seized by associated circuitry of the telephone exchange and the respective count control circuit first passes initial time rate pulses to the counting circuit while blocking overtime rate pulses. When the counting circuit determines that a maximum initial time period for the call initial time rate has been reached, a signal from the counting circuit causes the control circuit to change state and to pass overtime rate pulses while blocking the passage of initial time rate pulses. During the call the counting circuit performs the normal auxiliary control functions in the associated circuitry of the telephone exchange.

13 Claims, 6 Drawing Figures

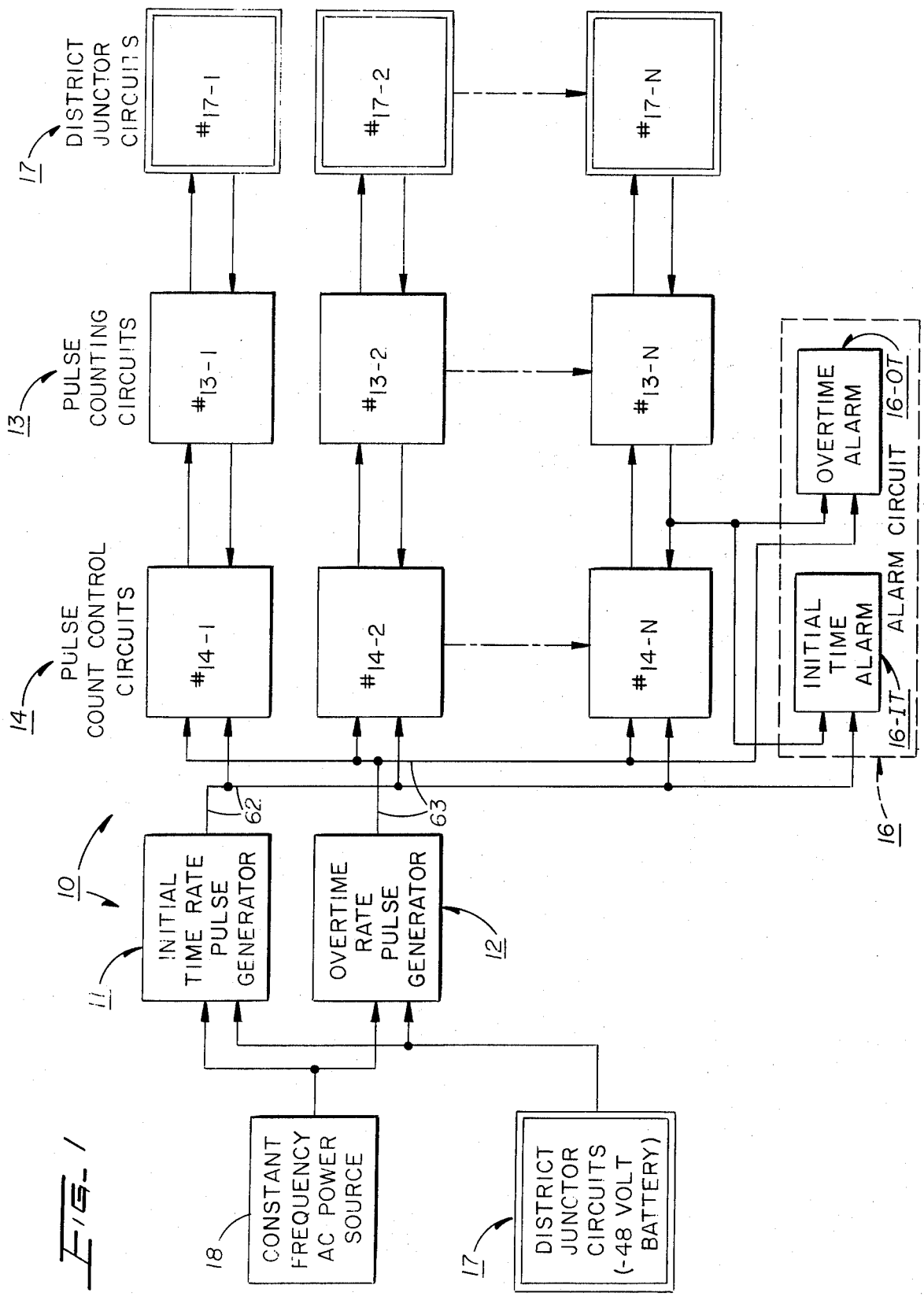

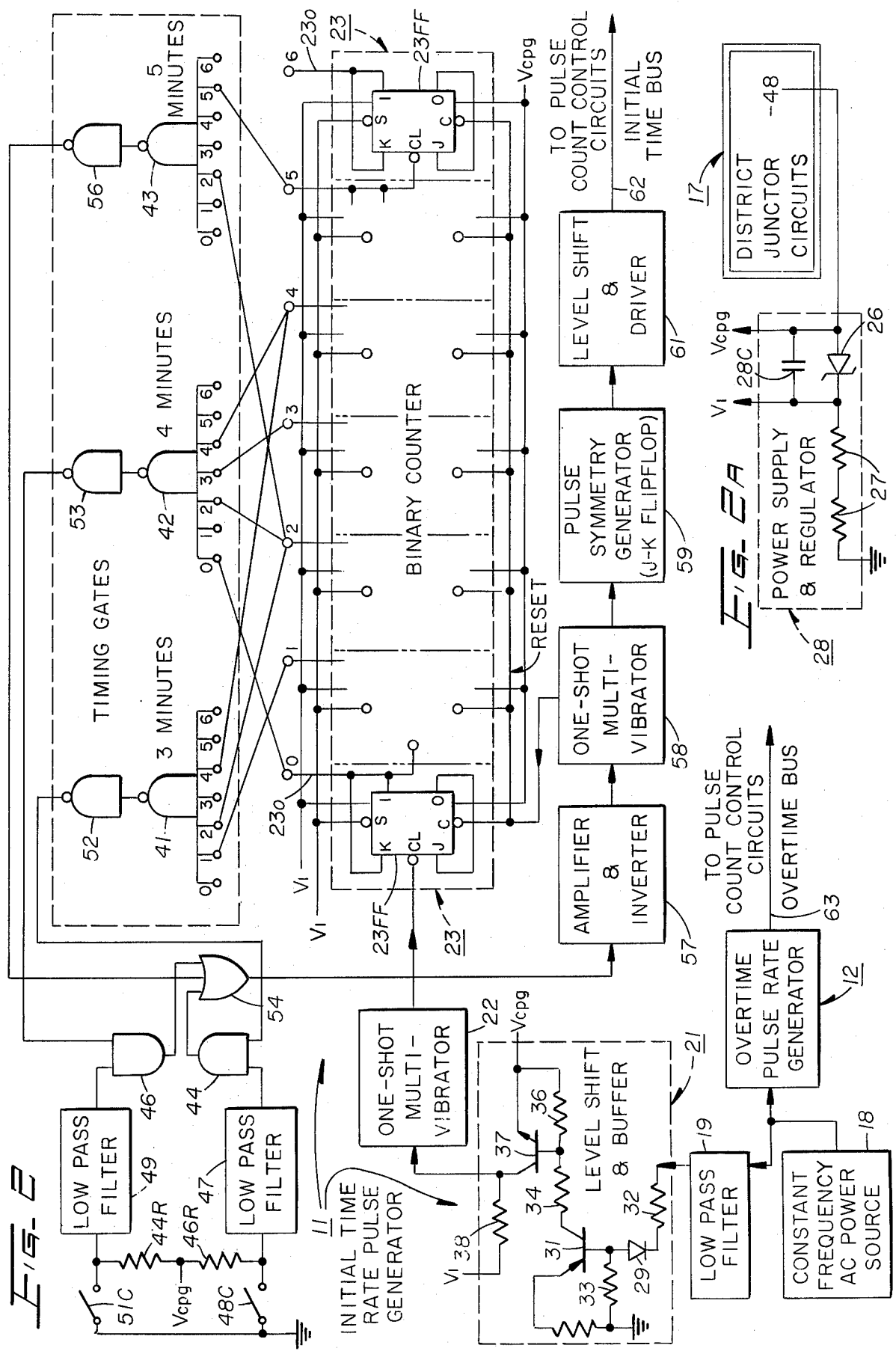

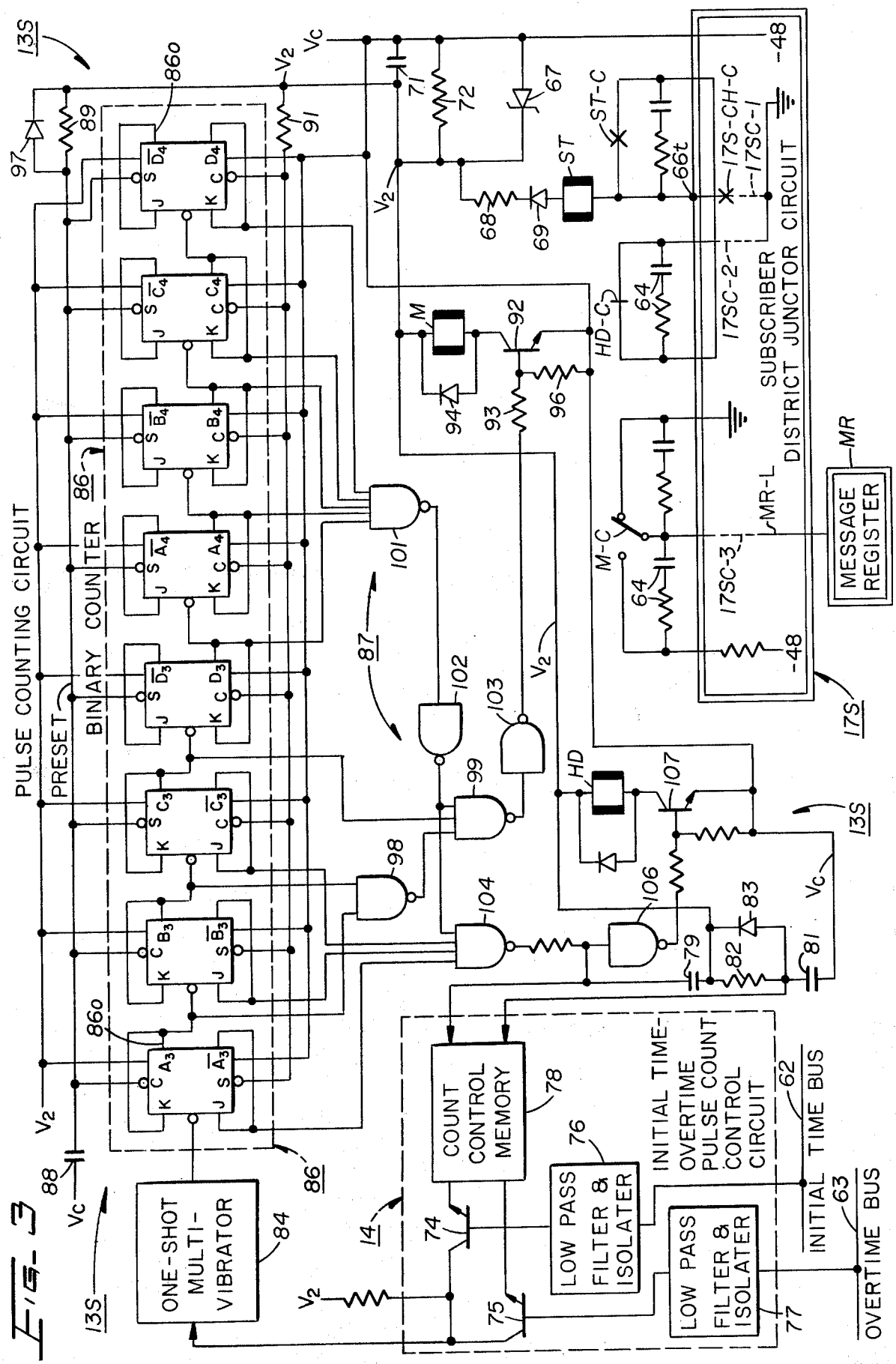

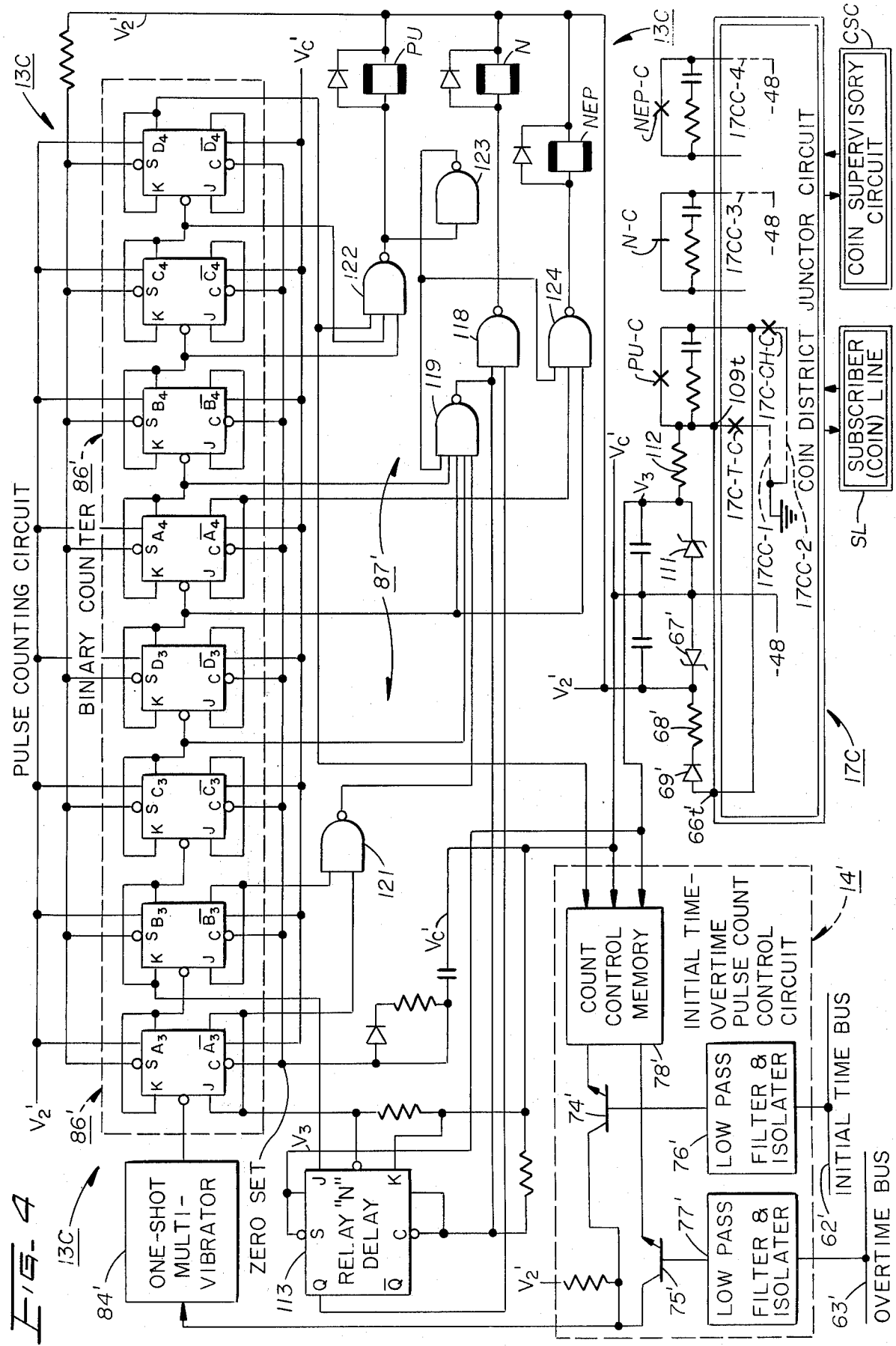

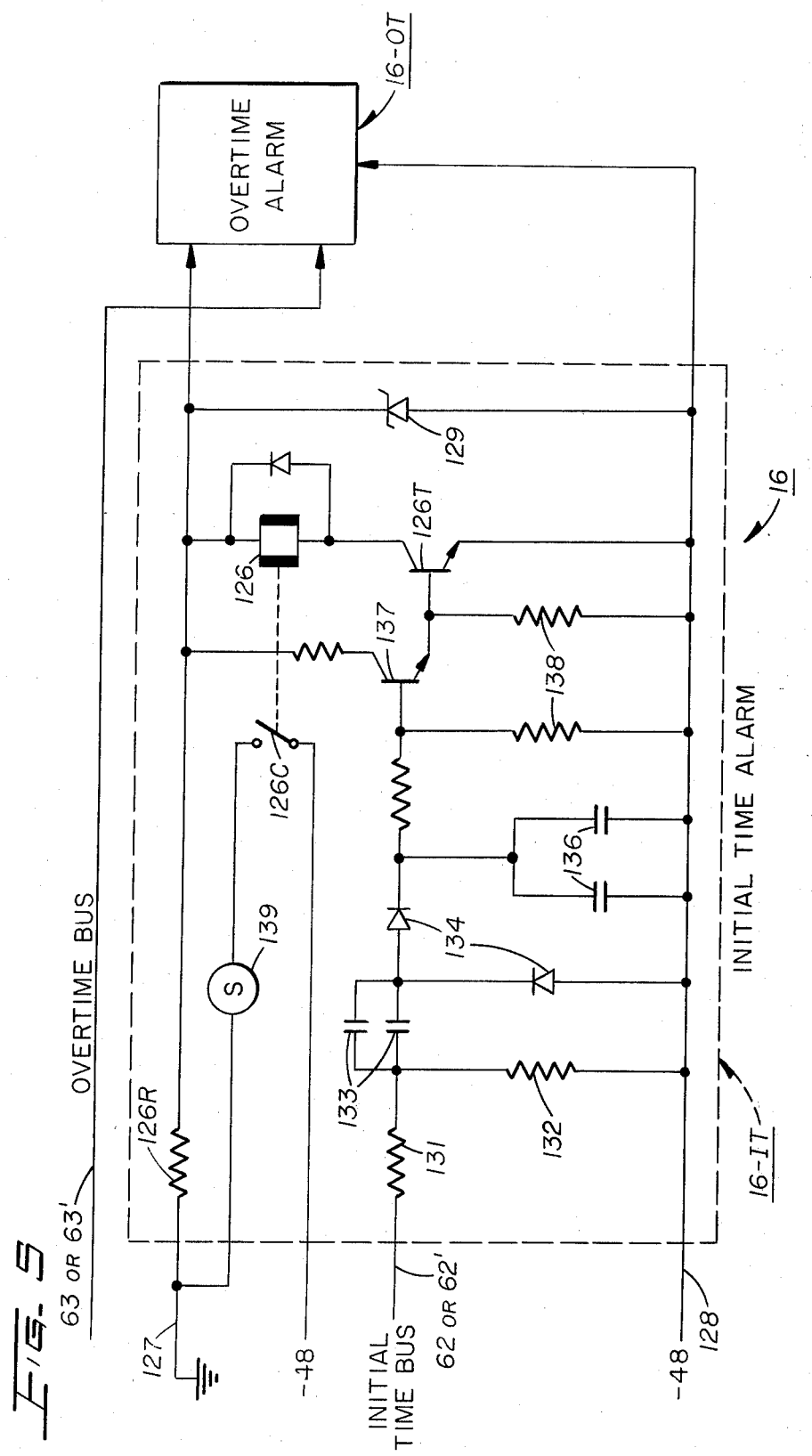

3,982,073

SYSTEM FOR MEASURING THE DURATION OF A TELEPHONE CALL

BACKGROUND OF THE INVENTION

1. Field of the Invention

This invention relates to a system for measuring the duration of a telephone call and more particularly to an economical, accurate electronic telephone call timing system capable of providing readily and independently variable call initial time and overtime rates.

2. Description of the Prior Art

Commonly, at the present time, timing systems utilized in an electromechanical telephone exchange central office for timing telephone calls are of the electromechanical type. Each timing system includes a synchronous motor which drives an elongated shaft extending adjacent a plurality of timing devices. Upon one of the timing devices being seized in response to the completion of a telephone call, a solenoid is energized to move a small drive gear longitudinally on the shaft into meshing engagement with a larger gear of the timing device. Gearing between the synchronous motor and the drive shaft, and the relative sizes of the drive gear and the larger gear driven thereby, are chosen so that the larger gear makes a single revolution in a time period corresponding to a maximum initial time period for a telephone call. During the rotation of the larger gear, a system of control cams thereon operates associated contacts to perform certain auxiliary control functions in the telephone exchange. In the event that the maximum initial time period is exceeded, the driven gear and its associated cams continue to revolve until the call is terminated, whereupon the gear is returned circumferentially to an initial start position by a coil-type biasing spring.

In these electromechanical timing systems, the initial time and overtime intervals for a telephone call are always identical because the same gear-cam assembly is used to measure both the initial time period and the overtime period. Further, to change the time interval involves changing the drive gearing for the control cams of each individual timing system, which requires that the timing system be taken out of service in order to make the desired changes.

U.S. Pat. No. 3,753,378, issued Apr. 6, 1971, to A. Leyburn et al, discloses a telephone call timing circuit in which pulses from a single pulse generator are counted in groups (e.g., 6 pulses per group) by a "pulse group" counter and a "group of pulses" counter arranged in sequence. When a predetermined number of pulse groups representative of an initial maximum time period have been counted and recorded in a call register, the output of the "pulse group" counter bypasses the "group of pulses" counter to an overtime register.

Also of interest to this invention is the U.S. Pat. No. 3,801,745, issued Apr. 2, 1974, to W. Zuckerman, for timing telephone calls placed through a PBX system. In this patent, pulses from a single pulse generator initially feed to an initial call time period circuit in the form of an adjustable R-C discharge network. When the network times out, it opens a blocking circuit to permit a continuously generated audioalarm signal to be placed on the line. The pulses then feed to an adjustable call overtime R-C discharge network which functions in the same manner to permit periodic audio-alarm signals to be placed on the line until the call is terminated.

Accordingly, the purpose of the subject invention is to provide an economical and accurate electronic telephone call timing system which can be readily wired for producing different initial time and overtime periods in the timing of both local subscriber and local coin telephone calls, and which is capable of producing a plurality of independent time-of-day changes in both the initial time and overtime periods, as desired.

SUMMARY OF THE INVENTION

In accordance with this invention, a system for measuring the duration of a telephone call includes first and second pulse generating circuits for generating pulses at selected frequencies representative of a call initial time rate and a call overtime rate, respectively. During a telephone call, the pulses from the first pulse generating circuit are counted until a maximum initial time period for the call initial time rate has been reached, after which the pulses from the second pulse generating circuit are counted to measure the call overtime period.

More specifically, each of the pulse generating circuits can be programmed independently to generate pulses at different frequencies representative of different call time rates. The pulses from the pulse generating circuits are applied to a plurality of pulse counting circuits through a plurality of respective pulse count control circuits. When one of the pulse counting circuits is seized by associated circuitry of a telephone exchange upon the completion of a telephone call, its respective pulse count control circuit first passes initial time rate pulses to the pulse counting circuit while blocking overtime rate pulses to the counting circuit. When the pulse counting circuit determines that a maximum initial time period has been reached, it applies a signal to the pulse count control circuit to change the state of the control circuit whereby it then passes overtime rate pulses to the counting circuit while blocking initial time rate pulses from passing to the counting circuit. During the telephone call, the counting circuit performs auxiliary control functions in the associated circuitry of the telephone exchange.

BRIEF DESCRIPTION OF THE DRAWINGS

FIG. 1 is a schematic block diagram of a telephone call timing system in accordance with the invention;

FIGS. 2 and 2A are schematic diagrams of a pulse generating circuit utilized in the telephone call timing system of FIG. 1;

FIG. 3 is a schematic diagram of a pulse counting circuit utilized in the measuring of the duration of a local subscriber telephone call;

FIG. 4 is a schematic diagram of a pulse counting circuit utilized in the measuring of the duration of a local coin telephone call; and FIG. 5 is a schematic diagram of an alarm circuit utilized in the telephone call timing system of FIG. 1.

DETAILED DESCRIPTION - GENERAL

Referring to FIG. 1, the disclosed embodiment of the invention relates to an electronic telephone call timing system 10 for use in electromechanical type telephone switching systems, in which initial time and overtime periods are independently adjustable for time periods of up to approximately 17⅔ minutes in 8⅓ second intervals, and which is capable of being readily converted to provide three independent "time-of-day" or "off-peak pricing" changes in both the initial time and overtime periods. The call timing system 10 includes an initial time rate clock or pulse generating circuit 11, an overtime rate clock or pulse generating circuit 12, a plurality (e.g., twenty) of timer or pulse counting circuits 13-1 to 13-N, a corresponding plurality of pulse count control circuits 14-1 to 14-N (one for each counting circuit), and an alarm circuit 16 for detecting and indicating a malfunction in the system.

Associated with each of the pulse counting circuits 13 is a district junctor circuit 17 of a conventional type which forms a part of what is known in the art as a 1 crossbar switching system. In accordance with this invention, the junctor circuit 17 seizes the pulse counting circuit 13 upon completion of a telephone call talking path connection and standard control functions in the junctor circuit then are performed under the direction of the pulse counting circuit. Further, while the invention has been disclosed in conjunction with equipment of a No. 1 crossbar switching system, it is to be understood that the principles thereof also can be utilized with other types of switching systems, as desired.

PULSE GENERATORS

The pulse generators 11 and 12, which are identical in construction and operation, are connected to a suitable AC voltage source 18 (e.g., 22 volts) having a constant frequency, such as 60 Hz, which is employed as a time standard or time reference. Thus, as is illustrated in FIG. 2 by the initial time rate pulse generator 11, power from the voltage source 18 is applied through a suitable low pass R-C filter circuit 19 and a level shift and buffer circuit 21, to a one-shot multivibrator 22. The one-shot multivibrator 22 triggers a conventional ripple-through binary counter 23 in the form of seven J-K flip-flops 23FF and thus has 128 stable states. Since the wiring of the flip-flops 23FF is conventional in nature, only the wiring for the first and last counter stages has been shown, it being understood that the intermediate stages are wired as shown for the first stage in a known manner.

As is illustrated in FIG. 2A, voltage $V_{cpg}$ for operating the pulse generator 11 is derived from a −48 volt battery source of its respective district junctor circuits 17. Similarly, another voltage $V_1$ on the order of 4.5–5.5 volts, is developed from the battery of the district junctor circuits 17 across a Zener diode 26 through a pair of dropping resistors 27 of a power supply and regulator circuit 28, and a power supply filter capacitor 28C functions as an integrated circuit transient current power source, in a manner known to those skilled in the art.

The level shift and buffer circuit 21 includes a diode 29 which permits only the negative portion of the signal wave from the power source 18 to be impressed upon the base of a constant current generator in the form of a PNP transistor amplifier 31, the output of which is controlled by a voltage divider consisting of resistors 32 and 33. An isolating load resistor 34 and a bypass resistor 36 form another voltage divider for impressing the filtered and buffered signal to the base of an NPN transistor amplifier 37, the collector of which, together with the operating voltage $V_1$ applied through a resistor 38, controls the application of a pulse to operate the one-shot multivibrator 22.

To provide the above-mentioned three independent "time-of-day" or "off-peak pricing" changes in the initial time period, the pulse generator 11 includes three timing or programming NAND gates 41, 42 and 43 having multiple inputs, and two AND gates 44 and 46. One input of the first AND gate 44 is selectively connectable to telephone exchange ground (a high potential with respect to the −48 volt potential $V_{cpg}$) through a suitable low pass R-C filter circuit 47 by the closure of a first control contact 48C, e.g., either manually, or automatically in a suitable manner (not shown), at a preselected time of the day. In this regard, where a plurality of the pulse generators 11 are involved, each pulse generator may be provided with its own individual control contact 48C, as shown, or the pulse generators may all be controlled by a single control contact 48C, and where multiple control contacts are utilized they may be operated independently, or simultaneously, as desired. Similarly, one input of the second AND gate 46 is connectable to ground through a low pass R-C filter circuit 49 by the closure of a second control contact 51C. The other input of the first AND gate 44 is connected to the output of the first timing gate 41 through a signal inverting gate 52 and the other input of the second AND gate 46 is connected to the output of the second timing gate 42 through a signal inverting gate 53. The outputs of the AND gates 44 and 46 are connected to inputs of a positive OR gate 54, and the output of the third timing gate 43 also is connected to an input of the OR gate through an inverting gate 56.

The J-K flip-flops 23FF of the binary counter 23 have output leads 23o which provide a time option strapping field for determining the pulse rate frequency of the pulse generator 11. In this regard, each of the output leads 23o is normally at a low potential, but a high potential will appear thereon when its flip-flop 23FF changes state during the operation of the counter 23, in a well known manner. Thus, by connecting proper strapping from selected ones of the flip-flop output leads 23o to respective inputs of the timing gates 41, 42 and 43, each timing gate can be rendered conductive at a desired frequency by driving its strapped inputs high at a selected time in the count cycle.

Thus, if both of the control contacts 48C and 51C are open or floating, their respective inputs of the AND gates 44 and 46 are held at the low potential $V_{cpg}$ through resistors 44R and 46R and the OR gate 54 operates only when the third timing gate 43 is energized as a result of its strapped inputs being driven high by their associated output leads 23o of the binary counter 23. The low potential output of the third timing gate 43 then is inverted by the gate 56 and applied, through the OR gate 54 and an amplifier and inverter 57, to a one-shot multivibrator 58. The one shot multivibrator 58 produces a negative going pulse to reset the flip-flops 23FF of the binary counter 23 to zero, and also produces a positive going pulse, the trailing edge of which toggles a pulse symmetry generator (J-K flip-flop) 59, the output of which is connected to a level shift and driver circuit (series of transistor amplifiers) 61. The pulse symmetry generator 59 functions in a known manner as a frequency reduction circuit in that its output goes from a low to a high potential and back to a low potential for each pair of pulses received from the one-shot multivibrator 58, whereby it produces one output pulse for each pair of input pulses, thereby doubling the maximum pulse output interval of the pulse generator 11 and thus doubling the maximum call time period capable of being measured by the pulse counting circuits 13.

The output of the level shift and driver circuit 61 is connected to an initial time bus 62 (see FIGS. 2 and 3) leading to the pulse count control circuits 14. Similarly, the output of an identical level shift and driver circuit (not shown) in the pulse generator 12 is connected to an overtime bus 63 also leading to the pulse count control circuits 14.

When the first, second and third timing gates 41, 42 and 43 are wired to the AND gates 44 and 46 and the OR gate 54 as in the illustrated embodiment of the invention, wherein the third timing gate 43 and its inverting gate 56 feed directly to the OR gate, the third gate will always operate prior to the first or second gates unless the third gate is strapped to the binary counter 23 for the longest time period, as shown in FIG. 2. With the third gate 43 so strapped, however, when the first control contact 48C is closed to ground to place a high potential on the associated input of the first AND gate 44, each time the other input of the gate 44 has a high potential placed thereon from the first timing gate 41 through the inverting gate 52, the AND gate is rendered conductive to cause the generation of a pulse by the OR gate 54. In this manner, the timing system 10 can be programmed for the initial time period as determined by the strapping between the binary counter 23 and the first timing gate 41.

Similarly, when the second control contact 51C is closed to ground, a high potential is placed on the associated input of the second AND gate 46, whereby each time a high potential is placed on its other input from the second timing gate 42 through the inverting gate 53, this AND gate is rendered conductive, thereby programming the system for its associated initial time period. As between the first and second timing gates 41 and 42, when both of the control contacts 48C and 51C are closed to ground, the gate which is strapped for the shortest time period (first gate 41 in the illustrated embodiment of the invention) will become the operative gate for timing purposes.

With the power source 18 having a frequency of 60 cycles per second, the minimum possible interval or period between output pulses from the pulse generator 11, as a result of the frequency reducing action of the pulse symmetry generator 59, is the time period (1/60 second) for each count of the binary counter 23, times 2, or 1/30 of a second. Similarly the maximum possible output pulse interval is the number of stable states of the binary counter 23, less the zero state, in this instance 127, multiplied by 1/30 = 4 7/30 seconds. Accordingly, since a pulse count capability of 250 pulses is utilized in the pulse counting circuits 13, as is subsequently described in greater detail, the maximum telephone call time period which can be measured with the illustrated embodiment of the invention is 250 pulses × 4 7/30 seconds = 1058⅓ seconds or 17 minutes and 38⅓ seconds. Conversely, the minimum telephone call period which can be measured is 250 × 1/30 = 250/30 = 8⅓ seconds, with any other time period between this minimum and the maximum, in 8⅓ second intervals, also being capable of measurement by proper strapping of the timing gates 41, 42 and 43 to the binary counter 23 output leads 23o.

Thus, the strapping of the output leads 23o of the binary counter 23 to one of the timing gates 41, 42 or 43 to produce a desired time period is determined by preparing a truth table for the binary counter 23, with each count of the counter (in the disclosed embodiment of the invention) being assigned a time interval of 8⅓ seconds, as is illustrated by the partial truth table shown in the following Table I:

TABLE I

| Col. 1 Desired Time Period-Minutes | Col. 2 Binary Count Number | Col. 3 High Potential Outputs of Binary Counter | | | | | | Col. 4 Actual Time Period Min. | Sec. |
|---|---|---|---|---|---|---|---|---|---|
| 1 | 8 | | | | 3 | | | 1 | 6.66 |
| 2 | 15 | 0 | 1 | 2 | 3 | | | 2 | 5.00 |
| 3 | 22 | | 1 | 2 | | 4 | | 3 | 3.33 |
| 4 | 29 | 0 | | 2 | 3 | 4 | | 4 | 1.66 |
| 5 | 36 | | | 2 | | | 5 | 5 | 0.00 |
| 6 | 44 | | | 2 | 3 | | 5 | 6 | 6.66 |
| 7 | 51 | 0 | 1 | | | 4 | 5 | 7 | 5.00 |
| 8 | 58 | | 1 | | 3 | 4 | 5 | 8 | 3.33 |
| 9 | 65 | 0 | | | | | | 6 9 | 1.66 |
| 10 | 72 | | | | 3 | | | 6 10 | 0.00 |
| 11 | 80 | | | | | 4 | | 6 11 | 6.66 |
| 12 | 87 | 0 | 1 | 2 | | 4 | | 6 12 | 5.00 |
| 13 | 94 | | 1 | 2 | 3 | 4 | | 6 13 | 3.33 |
| 14 | 101 | 0 | | 2 | | | 5 | 6 14 | 1.66 |
| 15 | 108 | | | 2 | 3 | | 5 | 6 15 | 0.00 |
| 16 | 116 | | | 2 | | 4 | 5 | 6 16 | 6.66 |
| 17 | 123 | 0 | 1 | | 3 | 4 | 5 | 6 17 | 5.00 |
| 17⅔ (max.) | 127 | 0 | 1 | 2 | 3 | 4 | 5 | 6 17 | 38.33 |

Accordingly, assuming a maximum initial time period of five minutes (300 seconds) is desired, by strapping the outputs 23o-2 and 23o-5 of the binary counter to one of the timing gates 41, 42 or 43, as is illustrated by the timing gate 43 in FIG. 2, the desired time period can be attained. In this regard, the gate 43 will be rendered operative on every 36th count of the counter 23, or every 36/60 of a second whereby the pulse generator 11 (through the frequency doubling action of the pulse symmetry generator 59) produces an output pulse every 1.2 seconds (36/60 × 2). Accordingly, when 250 pulses (the pulse counting capacity of the pulse counting circuits 13) have been produced by the pulse generator 11, the desired time period (250 × 1.2 = 300 seconds) will have expired. Stated another way, since for a five minute time period the pulse interval required is 300 seconds divided by 250 pulses = 1.2 seconds per pulse, to produce the necessary pulse interval of 1.2 seconds so as to achieve 250 pulses in the five minute (300 second) period, since each count of the counter 23 represents 1/30 of a second, as above described, the gate 43 must be activated every 36th count (1.2 ÷ 1/30) of the counter.

Similarly, a three or four minute time period, as illustrated in FIG. 2 by the strapping of the binary counter output leads 23o to the timing gates 41 and 42, respectively, or other timing periods, as desired, may be attained in the same manner. A specific one of the three time periods then may be selectively utilized by opening or closing the control contacts 48C and 51C as above described, to readily program the timing system 10 for the desired initial time period. The timing system 10 also may be independently programmed for a desired overtime period in the same manner by opening or closing the corresponding control contacts (not shown) in the overtime pulse generator 12.

CIRCUITRY FOR TIMING SUBSCRIBER TELEPHONE CALLS

FIG. 3 shows a pulse counting circuit 13S for measuring the duration of a telephone call placed through a standard subscriber district junctor circuit 17S from a local subscriber telephone. By way of illustration, the subscriber district junctor circuit 17S may be of the type disclosed in FIG. 25 and pages 84–86 of the U.S. Pat. No. 2,235,803, issued Mar. 18, 1941, to W. W. Carpenter. Since the district junctor circuit 17S forms no part of this invention, only that portion of the circuit necessary to illustrate the relationship of the subject invention thereto has been shown.

In this regard, the pulse counting circuit 13S includes a start relay ST which replaces a timing gear actuating magnet in the conventional subscriber district junctor circuit 17S, a hold relay HD having a contact HD-C which replaces a cam actuated contact in the district junctor circuit, and a message register relay M having a movable makebreak contact M-C which replaces a cam actuated contact in the district junctor circuit, the contacts being provided with suitable R-C protection networks 64 in a known manner. In other respects, the subscriber district junctor circuit 17S is unchanged and functions in a normal manner well known to those skilled in the art.

Thus, in the completion of a telephone call through the subscriber district junctor circuit 17S, closure of a charge relay contact 17S-CH-C therein applies ground to a terminal 66t and thus to the winding of the start relay ST, through other associated circuitry 17SC-1 (illustrated by a dashed line) of the junctor circuit. This energizes the start relay ST, which then locks operated through a contact ST-C, the hold relay contact HD-C and other associated circuitry 17SC-2 of the district junctor circuit 17S (to guard against possible interference with the timing by momentary switchhook flashing of the called party), and constitutes seizure of the pulse counting circuit 13S by the junctor circuit.

Voltage Vc for operating the pulse counting circuit 13S is derived from a −48 volt battery source for the subscriber district junctor circuit 17S. Application of ground to the winding of the start relay ST from the subscriber district junctor circuit 17S also causes another operating voltage $V_2$, such as on the order of 4.5–5.5 volts, to be developed across a Zener diode 67 through a dropping resistor 68 and a transient suppression diode 69. A power supply filter capacitor 71 then functions as an integrated circuit transient switching current source for the pulse counting circuit 13S, and an isolating resistor 72 provides a power supply ($V_2$) discharge path to permit rapid recycling or reseizure of the pulse counting circuit. Preferably, the pulse counting circuit 13S and the pulse count control circuit 14 are mounted on a printed circuit board having an insulated metal substrate (e.g., steel), of the type disclosed in the U.S. Pat. No. 3,296,099, issued Jan. 3, 1967 to D. Dinella, because of the electrical shielding characteristics of this type of board, with the metal substrate of the board utilized as either an absolute or a floating ground, as desired, to enhance the electrical shielding obtained.

As is shown in FIG. 3, each of the initial time-overtime pulse count control circuits 14 includes a pair of first and second transistor gates 74 and 75. The base of the first gate 74 is connected to the initial time bus 62 through a suitable low pass R-C filter and isolator circuit 76, and the base of the second gate 75 is connected to the overtime bus 63 through an identical low pass R-C filter and isolator circuit 77.

Upon seizure of the pulse counting circuit 13S, the transient build-up of the voltage $V_2$ is impressed through a capacitor 79 to a first input of a dual-gate type flip-flop or memory 78, while a second input of the flip-flop is held at a low potential momentarily by a capacitor 81 connected to the potential $V_c$. This helps insure setting of the count control flip-flop 78 to an initial state, in which it is then held by a high potential appearing at the output of an integrated circuit NAND gate 104, such that it applies a low potential to the emitter of the first transistor gate 74 and a high potential to the emitter of the second transistor gate 75. Thus, while initial time and overtime pulses are being continuously transmitted on the buses 62 and 63, as above-described, only the initial time pulses are passed by the conductive transistor gate 74 to the pulse counting circuit 13S, with the overtime pulses being blocked by the nonconductive transistor gate 75. After holding the second input of the flip-flop 78 momentarily low, to set the flip-flop to its initial state, the capacitor 81 charges to the voltage $V_2$ through a resistor 82. A diode 83 provides a discharge path for the capacitor 81 for rapid recycling.

The initial time pulses passed by the transistor gate 74 to the pulse counting circuit 13S are transmitted to a one-shot multivibrator 84 for triggering an 8-bit ripple-through binary counter 86 in which the counting stages are standard J-K flip-flops. However, in the illustrated embodiment of the invention, to simplify gating circuitry 87 required to operate the message register relay M and the hold relay HD at the beginning and near the end of each timing cycle, respectively, the flip-flops of the counter 86 are wired in a known manner as shown in FIG. 3 so that when the pulse counting circuit 13S is initially seized, the counter is preset to an initial count which is two counts below its maximum.

More specifically, a capacitor 88, which charges through a resistor 89, initially holds the "clear" leads of the first and second counter stages and the "set" leads of the remaining counter stages at the potential $V_c$ momentarily, while the set leads of the first and second counter stages and the clear leads of the remaining counter stages are held at the higher potential $V_2$ through a dropping resistor 91. The message register relay M is then immediately energized through the gating circuitry 87, which produces and applies a high output potential to the base of a transistor 92 through a base current limiting resistor 93, causing the transistor to conduct and operate the relay. The relay M is held operated for two or three initial time pulses, depending upon the relative phase of the pulses when the pulse counting circuit 13S was seized, at which time the state of the binary counter 86 (i.e., its "zero" state in which there are zero or low potentials at all of its outputs designated 86o) and the gating circuitry 87 causes the application of a low potential to the base of the transistor 92 and the relay is released. Any surge current developed by the removal of the current from the coil of the relay M is bypassed through a diode 94, and collector leakage current bypasses the transistor 92 through a resistor 96 in a known manner. A diode 97 (upper righthand corner of FIG. 3) provides a discharge path for the holding capacitor 88 for rapid recycling.

Operation of the message register relay M causes its movable contact M-C to disconnect a message register lead MR-L from ground and to connect the lead to the −48 volt battery of the district junctor circuit 17S, to activate a conventional message register MR through circuitry 17SC-3 of the junctor circuit. When the relay M subsequently is released, its movable contact M-C reconnects the message register MR back to ground to preclude inadvertent operation thereof.

In the illustrated embodiment of the invention, the gating circuitry 87, which may be of any suitable type, includes a plurality of integrated circuit NAND gates 98, 99 and 101 for operating the message register relay M. The output of the gate 98, which has dual inputs connected to respective outputs of the first and second stages of the binary counter 86, is applied to a first input of the gate 99. Similarly, the gate 101 has multiple inputs connected to respective outputs of the 4th, 5th, 6th, 7th and 8th stages of the binary counter 86, and its output is applied to a second input of the gate 99 through a signal inverting gate 102. The gate 99, which has a third input connected to a respective output of the third stage of the binary counter 86, feeds to a signal inverting gate 103, the output of which is applied to the base of the transistor 92 to operate the relay M as above described.

When the binary counter 86 has advanced to release the message register relay M as above described, timing of the telephone call begins and continues for the next 250 counts of the counter. On the 250th count (252nd or 253rd initial time pulse) of the counter 86, the state of the counter and the gating action of the integrated circuit gates 101 and 102, together with that of the integrated circuit NAND gate 104, develops a high potential on the output of an inverting gate 106. This high potential is applied to the base of a transistor 107, causing the transistor to conduct and to operate the hold relay HD, which then remains operated for one count of the binary counter 86. The gate 104 has multiple inputs connected to respective outputs of the first, second and third stages of the binary counter 86, and a fourth input connected to the output of the inverting gate 102.

If one of the parties has hung up just as the initial time period ends, whereby the change relay contact 17S-CH-C or one or more other contacts in the energizing circuit 17SC-1 for the start relay ST has already opened, while the circuitry 17SC-2 (which opens subsequent thereto) is still closed, operation of the hold relay for one count of the binary 86 counter at the end of the interval and the resultant opening of the contact HD-C causes the start relay to release, and the pulse counting circuit 13S and the pulse count control circuit 14 return to normal in readiness for the next call. This insures that charging for any time interval will not occur unless both the calling and the called parties are still connected to the talking circuit at the start of each interval. However, if the telephone call has not been terminated, so that the start relay ST remains energized through the charge relay contact 17S-CH-C and the contact circuitry 17SC-1, the circuits 13S, 14 go into an overtime cycle.

In this regard, the state of the binary counter 86, which caused operation of the hold relay HD, as above described, also caused the output of the gate 104 to change to a momentary low potential, which is impressed on the first input of the pulse count control memory or flip-flop 78, causing the flip-flop to change state. This causes the first output of the flip-flop 78 to change to a high potential and the second output of the flip-flop to change to a low potential, thereby closing the transistor gate 74 to block initial time pulses, and opening the overtime transistor gate 75 to gate or pass overtime clock pulses to the one-shot multivibrator 84.

The binary counter 86, which is next advanced to its 254th count (that is, its initial count two counts below its maximum count), then reoperates the message register relay M through the gating circuitry 87, to again actuate the message register MR as above-described. After three additional clock pulses, the binary counter 86 will again have advanced to release the relay M and the timing of the call is repeated. The count control flip-flop 78 now remains locked in its overtime state and continues to pass overtime pulses to the pulse counting circuit 13S until the pulse counting circuit and the pulse count control circuit 14 are released by the removal of ground from the start relay ST in the subscriber district junctor circuit 17S when the telephone call is terminated.

CIRCUITRY FOR TIMING COIN TELEPHONE CALLS

FIG. 4 discloses a pulse counting circuit 13C for use in measuring the duration of a telephone call being placed from a coin telephone and being routed through a telephone exchange under the control of a coin district junctor circuit 17C. Since the coin district junctor circuit 17C is of a standard known type and forms no part of the subject invention, only that portion of the circuit necessary to illustrate the relationship between the circuit and the subject invention has been shown.

In this regard the pulse counting circuit 13C includes a normal relay N, a pull-up relay PU and a nearing-end-of-period (e.g., 4.5 minutes in a 5 minute period) relay NEP having respective contacts N-C, PU-C and NEP-C which replace cam operated contacts in the coin district junctor circuit 17C. In other respects, the coin district junctor circuit 17C is unchanged and functions in a normal manner well known to those skilled in the art.

In the disclosed embodiment of the invention, after the coin district junctor circuit 17C has been connected to serve a call from a coin telephone subscriber line SL, a transmission relay contact 17C-T-C is closed to apply ground to a terminal 109t of the pulse counting circuit 13C, through other associated circuitry 17CC-1 (illustrated by a dashed line), thereby seizing the pulse counting circuit. This develops a voltage $V_3$, on the order of 4.5 to 5.5 volts, across a Zener diode 111 through a dropping resistor 112, for operating a J-K flip-flop or memory 78' in a respective pulse count control circuit 14', and, in the illustrated embodiment of the invention, for also operating a J-K flip-flop or relay N delay circuit 113 in the pulse counting circuit 13C. When the called party answers, a charge relay contact 17C-CH-C in the junctor circuit 17C closes to apply ground to a terminal 66$t'$ through other associated circuitry 17CC-2, to develop a similar voltage $V_2'$ across a Zener diode 67' through a dropping resistor 68' and a diode 69', for providing power to the remainder of the pulse counting circuit 13C and the pulse count control circuit 14'. The separate voltage $V_3$ subsequently insures continuous operation of the count control memory 78' as the timing circuitry goes into an overtime period, when the voltage $V_2'$ is temporarily deactivated to reset the pulse counting circuit 13C as is subsequently described hereinafter. A voltage $V_c'$ also is derived from a −48 volt battery source of the coin district junctor circuit 17C. As in the embodiment of the invention in FIG. 3, the pulse counting circuit 13C and the pulse count control circuit 14' preferably are mounted on a metal substrate type printed circuit board (not shown).

When the pulse counting circuit 13C has been seized by closure of the relay contact 17C-CH-C in the coin district junctor circuit 17C, the pulse count control circuit 14' operates in the same manner as the pulse count control circuit 14 in FIG. 3. Thus, since the count control flip-flop 78' initially is impressing a low potential on the emitter of a first transistor gate 74' and a high potential on the emitter of a second transistor gate 75', the first transistor gates or passes the initial time clock pulses appearing on an initial time bus 62', while the second transistor blocks the overtime clock pulses appearing on an overtime bus 63'. The initial time clock pulses then are transmitted to a one-shot multivibrator 84' which triggers a ripple-through binary counter 86' in the form of eight J-K flip-flops wired as shown in FIG. 4. After a suitable time delay, which is provided by the relay N delay circuit (J-K flip-flop) 113, to permit certain relay functions in the coin district junctor circuit 17C to take place, on the third initial time pulse the binary counter 86', through the relay N delay circuit and gating circuitry 87', operates the relay N, which then opens its contact N-C to open circuitry 17CC-3 of the junctor circuit and begin the measured time period.

In the illustrated embodiment of the invention, the gating circuitry 87', which may be of any suitable type, includes a plurality of integrated circuit NAND gates 118, 119, 121 and 122 for operating the normal relay N. The gate 118 has dual inputs connected, respectively, to an output of the relay N delay flip-flop 113 and the output of the gate 119, and is responsive in a known manner to high potentials on both inputs to produce a low potential at its output, to cause operation of the relay N. The gate 119 has one input connected to the output of the gate 121, three inputs connected to respective outputs of the third, fourth and fifth stages of the binary counter 86', and a fifth input connected to the output of the gate 122 through an inverting gate 123. The gate 121 has dual inputs wired to respective outputs of the first and second counter stages, and the gate 122 has three inputs wired to respective outputs of the last three counter stages.

On the 224th initial time pulse, the output of the gate 122 produces a low potential at its output to cause operation of the pull-up relay PU, which closes its contact PU-C to provide a ground for maintaining the operating voltage $V_2'$ when the charge relay contact 17C-CH-C is subsequently opened in the normal operation of the coin district junctor circuit 17C. On the 232nd initial time pulse the binary counter 86', through a suitable integrated circuit NAND gate 124, causes operation of the nearing-end-of-period relay NEP. The operated relay NEP closes its contact NEP-C to cause conventional circuitry 17CC-4 in the junctor circuit 17C to perform its normal functions, including the operation of a calling line register (not shown) and the summoning of a coin supervisory circuit CSC, at which time the contact 17C-CH-C is released. The coin supervisory circuit then performs its normal functions, including an indication to the calling party that an additional coin should be deposited for the overtime period, testing for the deposit of the overtime coin, etc., in a known manner, as the timing circuits 13C, 14' continue to function.

The relay NEP remains operated until the 240th initial time pulse and then is released. On the 253rd initial time pulse the initial time period is up and the normal relay N releases to close its contact N-C and end the measured time period. The 256th initial time pulse to the binary counter 86' then resets all of its flip-flops in a conventional manner, causing the pull-up relay PU to release. The last stage of the counter 86', which feeds to the count control memory (J-K flip-flop) 78', then causes it to change state, whereby the initial time transistor 74' now blocks initial time pulses from the initial time bus 62' and the overtime transistor 75' conducts to gate pulses from the overtime bus 63'. Assuming the call has not been terminated, and that the coin supervisory circuit CSC has determined that the required overtime coin has been deposited, whereby it has released from the junctor circuit 17C, and the contact 17C-CH-C has reclosed to again develop the voltage potential $V_2'$, the counting cycle then repeats, with the pulse count control circuit 14' locked in the overtime counting state, and the pulse counting circuit 13C continues to count (and recycle if necessary) until ground is removed from the terminal 109$t$ by opening of the contact 17C-T-C in the coin district junctor circuit 17C when the telephone call is terminated.

However, if the coin supervisory circuit CSC has determined that deposit of the required overtime coin has not been made by the end of the initial time period, it calls an operator on line in a conventional manner, to supervise the call until the proper coin has been deposited. Since the contact 17C-CH-C and the contact PU-C are now both open, this causes the voltage $V_2'$ to be removed, thus resetting and temporarily deenergizing the pulse counting circuit 13C until the coin supervisory circuit CSC releases the coin district junctor circuit 17C and causes reclosing of the contact 17C-CH-C. During this transition period, however, the voltage $V_3$ is maintained through the transmission relay contact 17C-T-C and the circuitry 17CC-1, to keep the count control memory (flip-flop) 78' operative so that when the pulse counting circuit 13C and the pulse count control circuit 14' are reseized for overtime purposes by reclosure of the contact 17C-CH-C, overtime pulses still will be passed by the pulse count control circuit and timing will be carried out at the overtime rate.

ALARM CIRCUIT

Referring to FIG. 5, the alarm circuit 16 is designed to detect a lack of initial time or overtime pulses on the buses 62, 63 or 62', 63', or lack of battery for operating the timer system 10. The alarm circuit 16 also is self-testing in that it has the capability of detecting a malfunction within the alarm circuit.

More specifically, the alarm circuit 16 includes an initial time alarm circuit 16-IT and an overtime alarm circuit 16-OT. Since each of the alarm circuits 16-IT and 16-OT are identical, only the initial time alarm circuit has been shown in detail and will be described. Thus, the initial time alarm circuit 16-IT includes a normally operated relay 126, the winding of which is connected in series with a dropping resistor 126R and a transistor 126T across a ground lead 127 and a lead 128 connected to the −48 volt battery of the district junctor circuits 17. The dropping resistor 126R and a Zener diode 129 regulate the voltage level across the relay 126 and across a similar relay in the overtime alarm circuit 16-OT.

The initial time pulses on the bus 62 or 62' feed into the alarm circuit 16-IT through an isolation resistor 131, which provides a high impedance to preclude a malfunction in the alarm circuit from feeding back along the bus and interfering with the application of timing pulses to the pulse counting circuits 13. The resistor 131 and a resistor 132 form a voltage divider to produce a low impedance signal, which is applied to a voltage-doubling circuit of a known type and including a pair of DC blocking capacitors 133, a pair of diodes 134 and a pair of filter capacitors 136.

As long as initial time pulses are being transmitted along the bus 62 or 62' and into the alarm circuit 16-IT, the capacitors 136 remain charged and an amplifying transistor 137 applies a high potential to the base of the transistor 126T to maintain it conductive so that the relay 126 remains energized. However, if the initial time pulses are interrupted, the capacitors 136 discharge through transistor bypass resistors 138 and the transistor 126T becomes nonconductive to deenergize the relay 126, a contact 126C of which then closes to operate a suitable signal device 139 (e.g., light). Similarly, if the −48 volt battery for operating the timer system 10 becomes inoperative, or the alarm circuit 16-IT malfunctions, the relay 126 loses power and becomes deenergized and its contact 126C closes to operate the signal device 139.

SUMMARY OF FEATURES

The disclosed embodiments of the invention provide a new and improved electronic system 10 for measuring the duration of a telephone call in electromechanical telephone exchanges, which can readily be wired to produce different initial time and overtime periods of up to approximately 17⅔ minutes in 8⅓ second intervals. The timing system 10 also is capable of providing a plurality of "time-of-day" or "off-peak pricing" changes in both the initial time and overtime periods by merely closing one or the other of the selector contacts 48C or 51C in the pulse generating circuits 11 and 12 to ground, whereby different time rates readily can be provided for both initial time and overtime periods, and either time rate can be changed independently of the other time rate as desired. In addition, a plurality of pulse counting circuits 13S or 13C can be serviced by a single pair of pulse generating circuits 11 and 12, whereby the timing system 10 is economical to fabricate and is compact in size so that it readily can be incorporated into an existing telephone exchange. The disclosed timing system 10 also is capable of performing the normal auxiliary control functions in the associated circuitry of a telephone exchange, utilizing the pulse counting circuits 13S for timing local subscriber calls, or the pulse counting circuits 13C for timing local coin calls, respectively. What is claimed is:

1. A system for measuring the duration of a telephone call, which comprises:
    first and second pulse generating means for generating pulses at selected frequencies representative of a call initial time rate and a call overtime rate, respectively, and
    pulse counting means for counting the pulses from said first pulse generating means until a maximum initial time period for the call initial time rate is reached, and for then counting the pulses from said second pulse generating means to measure the call overtime period.

2. A system for measuring the duration of a telephone call, as recited in claim 1, in which:
    said pulse counting means is one of a plurality of identical pulse counting means for receiving pulses from said first and second pulse generating means to measure a plurality of telephone calls simultaneously.

3. A system for measuring the duration of a telephone call, as recited in claim 2, which further comprises:
    alarm means for detecting whether pulses from said first and second pulse generating means are being received by the plurality of said pulse counting means.

4. A system for measuring the duration of a telephone call, as recited in claim 1, which further comprises:
    means responsive to circuitry in a telephone exchange for energizing said pulse counting means upon the completion of a telephone call talking connection in the exchange.

5. A system for measuring the duration of a telephone call, as recited in claim 4, which further comprises:
    means responsive to said pulse counting means for controlling circuit functions in the telephone exchange during a timing cycle.

6. A system for measuring the duration of a telephone call, as recited in claim 1, which further comprises:
    control means responsive to said pulse counting means for selectively passing pulses from one of said pulse generating means to said pulse counting means while blocking passage of pulses from said other pulse generating means to said pulse counting means.

7. A system for measuring the duration of a telephone call, as recited in claim 6, in which said pulse counting means includes:
    means responsive to circuitry in a telephone exchange for energizing said pulse counting means upon the completion of a telephone call talking connection in the exchange;
    a binary pulse counter connected to receive pulses from said control means and thereby to count the pulses from said first and second pulse generating means;
    multiple relay means for controlling circuit functions in the telephone exchange during a timing cycle; and
    gating means interconnecting said binary pulse counter and said relay means to cause operation of said multiple relay means at respective predetermined points in the timing cycle.

8. A system for measuring the duration of a telephone call, as recited in claim 7, which further comprises:
   a relay forming a part of said multiple relay means and operative to begin the timing of a coin telephone call;
   a delay circuit forming a part of said pulse counting means and responsive to said binary counter for initially delaying operation of said relay when said pulse counting means is initially energized;
   a circuit forming a part of said control means for setting said control means to one of two states, to determine which of the pulses from said first and second pulse generating means are passed to said binary pulse counter;
   means for developing a first voltage from a battery in the telephone exchange, for maintaining said state-setting circuit of said control means continuously operative during the telephone call, including a transition period between an initial time period and an overtime period; and
   means for developing a second voltage from the battery in the telephone exchange for operating said binary pulse counter, the second voltage being interruptible to reset said binary pulse counter and to temporarily deenergize said binary pulse counter during the transition period between the initial time period and the overtime period.

9. A system for measuring the duration of a telephone call, as recited in claim 1, which further comprises:
   independent means for setting each of said first and second pulse generating means to generate pulses at different selected frequencies representative of different call time rates.

10. A system for measuring the duration of a telephone call, as recited in claim 9, in which each of said means for setting said pulse generating means includes:
    a binary counter having a plurality of outputs;
    means for applying signals to said binary counter at a preselected constant frequency;
    a plurality of timing gates each having a plurality of inputs connected to outputs of said binary counter and selectively energizable by said counter upon said counter reaching respective predetermined counts, to produce pulses at different time interval frequencies; and
    control means for selectively passing the pulses from one of said timing gates to said pulse counting means while precluding the passage of pulses from said other timing gates.

11. A system for measuring the duration of a telephone call, as recited in claim 10, in which said control means includes:
    additional gates having inputs connected to said timing gates; and
    means for selectively grounding other inputs of said additional gates to control the passing of pulses from one of said timing gates while precluding the passage of pulses from said other timing gates.

12. A system for measuring the duration of telephone calls, which comprises:
    a constant frequency electrical power source;
    first and second binary counters;
    means responsive to said constant frequency electrical power source for applying signals of constant frequency to said first and second binary counters;
    a first set of timing gates having inputs connected to outputs of said first binary counter and selectively energizable by said counter upon said counter reaching respective predetermined counts, to produce pulses at different time intervals representative of different call initial time rates;
    a second set of timing gates having inputs connected to outputs of said second binary counter and selectively energizable by said counter upon said counter reaching respective predetermined counts, to produce pulses at different time intervals representative of different call overtime rates;
    a plurality of initial time rate and overtime rate pulse counting circuits;
    a plurality of first control means, one for each of said pulse counting circuits, each of said first control means being capable of passing call initial time rate pulses to its respective pulse counting circuit while blocking the passage of call overtime rate pulses to said pulse counting circuit, and each of said first control means being responsive upon its respective pulse counting circuit determining that a maximum initial time period for a call initial time rate has been reached, to pass overtime rate pulses to said pulse counting circuit while blocking the passage of initial time rate pulses to said pulse counting circuit;
    second control means for selectively passing the call initial time rate pulses from one of said first timing gates to said plurality of first control means while precluding the passage of the initial time rate pulses from the other of said first timing gates; and
    third control means for selectively passing the call overtime pulses from one of said second timing gates to said plurality of first control means while precluding the passage of the overtime rate pulses from the others of said second timing gates.

13. A system for measuring the duration of telephone calls, as recited in claim 12, in which each of said pulse counting circuits includes:
    means responsive to circuitry in a telephone exchange for energizing said pulse counting circuit upon the completion of a telephone call talking connection in the exchange;
    a binary pulse counter connected to receive pulses from said first control means for said pulse counting circuit;
    multiple relay means for controlling circuit functions in the telephone exchange during a timing cycle; and
    gating means interconnecting said binary pulse counter and said relay means to cause operation of said multiple relay means at respective predetermined points in the timing cycle.

* * * * *